United States Patent
Bradbury et al.

(10) Patent No.: US 9,495,157 B1
(45) Date of Patent: Nov. 15, 2016

(54) FINGERPRINT-BASED BRANCH PREDICTION

(71) Applicant: International Business Machines Corporation, Armonk, NY (US)

(72) Inventors: Jonathan D. Bradbury, Poughkeepsie, NY (US); Giles R. Frazier, Austin, TX (US); Michael Karl Gschwind, Chappaqua, NY (US); Christian Jacobi, West Park, NY (US); Anthony Saporito, Highland, NY (US); Chung-Lung K. Shum, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/960,535

(22) Filed: Dec. 7, 2015

(51) Int. Cl.
*G06F 9/38* (2006.01)
*G06F 9/30* (2006.01)
*G06F 12/08* (2016.01)

(52) U.S. Cl.
CPC ......... *G06F 9/30058* (2013.01); *G06F 9/3844* (2013.01); *G06F 12/0875* (2013.01); *G06F 2212/452* (2013.01)

(58) Field of Classification Search
CPC .................................................. G06F 9/3844
See application file for complete search history.

(56) References Cited

U.S. PATENT DOCUMENTS

| | | | |
|---|---|---|---|
| 7,082,520 B2 * | 7/2006 | Bonanno | G06F 9/3806 |
| | | | 712/236 |
| 7,328,332 B2 | 2/2008 | Tran | |
| 2003/0041230 A1 * | 2/2003 | Rappoport | G06F 9/3848 |
| | | | 712/238 |
| 2012/0260069 A1 * | 10/2012 | Bishop | G06F 9/3855 |
| | | | 712/208 |
| 2013/0054942 A1 | 2/2013 | Serrano | |

OTHER PUBLICATIONS

Jamil, RAM versus CAM, 1997, IEEE, 0278-6648/97, 4 pages.*
"Branch predictor"; Wikipedia; retrieved on Nov. 24, 2015 from https://en.wikipedia.org/wiki/Branch_predictor; p. 1-10; Oct. 29, 2015.
"Branch Target Buffers"; University of Haiwaii; retrieved on Nov. 24, 2015 from http://www-ee.eng.hawaii.edu/~tep/EE461/Notes/ILP/buffer.html; p. 1-2.

(Continued)

*Primary Examiner* — Andrew Caldwell
*Assistant Examiner* — Jyoti Mehta
(74) *Attorney, Agent, or Firm* — Cantor Colburn LLP; William A. Kinnaman, Jr.

(57) ABSTRACT

Embodiments relate to fingerprint-based branch prediction. An aspect includes based on encountering a branch instruction during execution of software on a processor of a computer system, determining a fingerprint of the software, the fingerprint comprising a representation of a sequence of behavior that occurs in the processor while the software is executing. Another aspect includes based on determining that a match for the fingerprint and the branch instruction is located in an entry in the prediction table: predicting the branch instruction according to the associated prediction field. Another aspect includes based on determining that no match for the fingerprint and the branch instruction are located in an entry in the prediction table: creating a new entry in the prediction table for the fingerprint and the branch instruction.

10 Claims, 6 Drawing Sheets

(56) References Cited

OTHER PUBLICATIONS

"CSE P548—Dynamic Branch Prediction"; University of Washington; retrieved on Nov. 24, 2015 from http://course.cs.washington.edu/courses/csep548/06au/lectures/branchPred.pdf; pp. 1-15; 2006.

Moreira, Francis B., et al; "Profiling and Optimizing Micro-Architecture Bottlenecks on the Harware Level"; University of Massachussetts; p. 1-8; 2014.

Yoo, Wucherl, et al.; "Automated Fingerprinting of Performance Pathologies Using Performance Monitoring Units (PMUs)"; Proc. of USENIX Workshop in Hot Topics in Parallelism; p. 1-6; 2011.

\* cited by examiner

| | | |
|---|---|---|
| BRANCH HISTORY 602A | FINGERPRINT 603A | PREDICTION FIELD 604A |
| BRANCH HISTORY 602B | FINGERPRINT 603B | PREDICTION FIELD 604B |
| BRANCH HISTORY 602C | FINGERPRINT 603C | PREDICTION FIELD 604C |
| ... | ... | ... |
| BRANCH HISTORY 602N | FINGERPRINT 603N | PREDICTION FIELD 604N |

PATTERN HISTORY TABLE
FINGERPRINT MODULE
600

FINGERPRINT-BASED BRANCH PREDICTION

BACKGROUND

The present invention relates generally to branch prediction in a computer processor, and more specifically, to fingerprint-based branch prediction.

Branch prediction is used in computer processors to improve performance of execution of computer programs. In branch prediction, the direction of a branch instruction is predicted before the branch is resolved, such that execution of the computer program that includes the branch instruction may continue speculatively without waiting for the branch resolution. There are many branch prediction schemes for predicting the outcome of a branch instruction. Branch prediction may be performed based on the history of the resolution of the previous instances of a branch instruction. For example, the branch history may be given by a sequence of 1's and 0's corresponding to the most-recent executions of the branch instruction, where a 0 indicates that the branch was not taken and a 1 indicates that the branch was taken.

SUMMARY

Embodiments include a method, system, and computer program product for fingerprint-based branch prediction. An aspect includes based on encountering a branch instruction during execution of software on a processor of a computer system, determining a fingerprint of the software, the fingerprint comprising a representation of a sequence of behavior that occurs in the processor while the software is executing. Another aspect includes determining whether a match for the fingerprint and the branch instruction is located in an entry in a prediction table, the entry including an associated prediction field. Another aspect includes based on determining that a match for the fingerprint and the branch instruction is located in an entry in the prediction table: predicting the branch instruction according to the associated prediction field; and based on resolution of the branch instruction, updating the associated prediction field. Another aspect includes based on determining that no match for the fingerprint and the branch instruction are located in an entry in the prediction table: creating a new entry in the prediction table for the fingerprint and the branch instruction; and based on resolution of the branch instruction, updating a prediction field of the new entry according to the resolution.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Embodiments of fingerprint-based branch prediction are provided, with exemplary embodiments being discussed below in detail. Branch prediction accuracy is improved by using a fingerprint that gives a picture of the behavior of the current processor workload in the branch prediction process. Branch mispredictions may cause significant performance impact in a processor. The frequency of branch mispredictions may be decreased by use of fingerprints, because additional program behavior, such as previous instruction paths or the behavior of other types of instructions leading up to the branch instructions that is being predicted, is taken into account in the branch prediction via the fingerprint.

A fingerprint is a representation of specific processor behavior that occurs when a given code section of software is executing. The processor behavior may be any recognizable behavior in various embodiments. Examples of time-domain fingerprints include particular sequences of branch prediction hits and misses, a particular sequence of data cache hits and misses, or any other behavior or pattern recognizable by hardware. Further examples of time-domain code fingerprints include: data cache hit miss sequences (at various cache levels); data cache hit miss sequences subsequent to or leading up to a given instruction; data cache hit miss sequence for a specific set of loads identified by an instruction prefix; branch history value when a given instruction is executed; call signature or call signature history at a given instruction; and sequence of values of a come from address register (CFAR) of the processor at a given instruction. A fingerprint may also be based on steady-state conditions that include the following characteristics: average L1 data cache hit rate, L2 data cache hit rate, L3 data cache hit rate, average branch mispredict rate, average instruction fetch discard rate, and/or average instruction completion rate.

Various embodiments include a fingerprint recognition function, or fingerprint module. There may be a respective fingerprint recognition function for each type of fingerprint being detected. For example, a fingerprint detector that detects a specific sequence of load instruction data cache hits and misses may be implemented using a shift register that is referred to as a fingerprint register. Such a fingerprint register holds the sequence of the most-recent data cache hits and misses. A fingerprint register may be of arbitrary length in various embodiments, for example, 32 or 64 bits. The sequence of 1's and 0's in such a fingerprint register represent the most-recent history of load instruction data cache hits and misses, where a 0 indicates a data cache miss and a 1 indicates a data cache hit. Multiple shift registers may be included in the processor to provide other types of fingerprints, such as sequences of branch prediction hit/misses, or sequences of data cache hit/misses for multiple cache levels. Further embodiments may generate a fingerprint that is based on a rate of occurrence of an event, such as the rate of load data cache misses over the previous 1000 load instructions, or the rate of incorrect branch predictions over the previous 1000 branch instructions. Further embodiments of a fingerprint may be generated based on function of multiple different fingerprints, using, for example, a sum or a difference of various fingerprints. Further embodiments of a fingerprint may be equal to the current calling context of the program or equal to the current value of the CFAR for the previous instance of a branch instruction. Any combination of different fingerprint types may be used in various embodiments.

Embodiments may include prediction tables such as a pattern history table to predict whether or not a branch will be taken or not taken, and a branch target buffer to predict branch instruction target addresses. Either the pattern history table or the branch target buffer includes a prediction field, and also may include additional prediction fields, where each prediction field is associated with a unique fingerprint.

In a pattern history table, each entry is associated with a particular sequence of taken/not taken branches, referred to here as a branch history. There may be a single global pattern history table for all branch instructions, or multiple local pattern history tables in which each table is associated with a particular branch instruction at a given address. In any pattern history table entry, there may be multiple prediction fields, each being associated with a particular fingerprint. In some embodiments, the prediction field for a pattern history table may comprise an n-bit state machine that predicts whether or not the branch will be taken. When a branch instruction is to be predicted, if the pattern history table entry corresponding to the branch history does not contain a prediction field corresponding to a given fingerprint, then a new prediction field is created corresponding to the existing fingerprint, and the prediction field is updated according to the resolution of the branch instruction. Then, when the branch instruction is subsequently encountered with the same current fingerprint and branch history, the prediction field for the entry is used. In some embodiments, the current fingerprint may be used to index into the pattern history table; in other embodiments, the branch instruction address may be used.

The prediction field in each entry in a branch target buffer is a target instruction address. The branch target buffer may include multiple entries for the same branch instruction address, each entry being associated with a different fingerprint. If the branch target buffer does not contain an entry corresponding to the branch instruction address and fingerprint that exists when a branch instruction is being predicted, a new entry is created and the prediction field (i.e. the branch target address) is updated according to the resolution of the branch instruction.

Various embodiments may use fingerprints in conjunction with any type of branch prediction scheme, or with a hybrid branch prediction scheme that bases predictions on multiple types of predictors. If the pattern history table or branch target buffer becomes full and an additional entry is needed, entries may be replaced using any replacement scheme, such as to replace the least-recently used entry. Further embodiments may include a branch target buffer that uses historical information for each branch instruction address/fingerprint match. For example, an entry may include a sequent of 1's and 0's indicating whether the target corresponding to the branch instruction address/fingerprint in the entry was correctly predicted (1) or mispredicted (0) for the most-recent instances of the branch instruction. When the most-recent entries of the sequence contain a threshold number of 0's, the entry may be removed from the branch target buffer.

Figure 1:
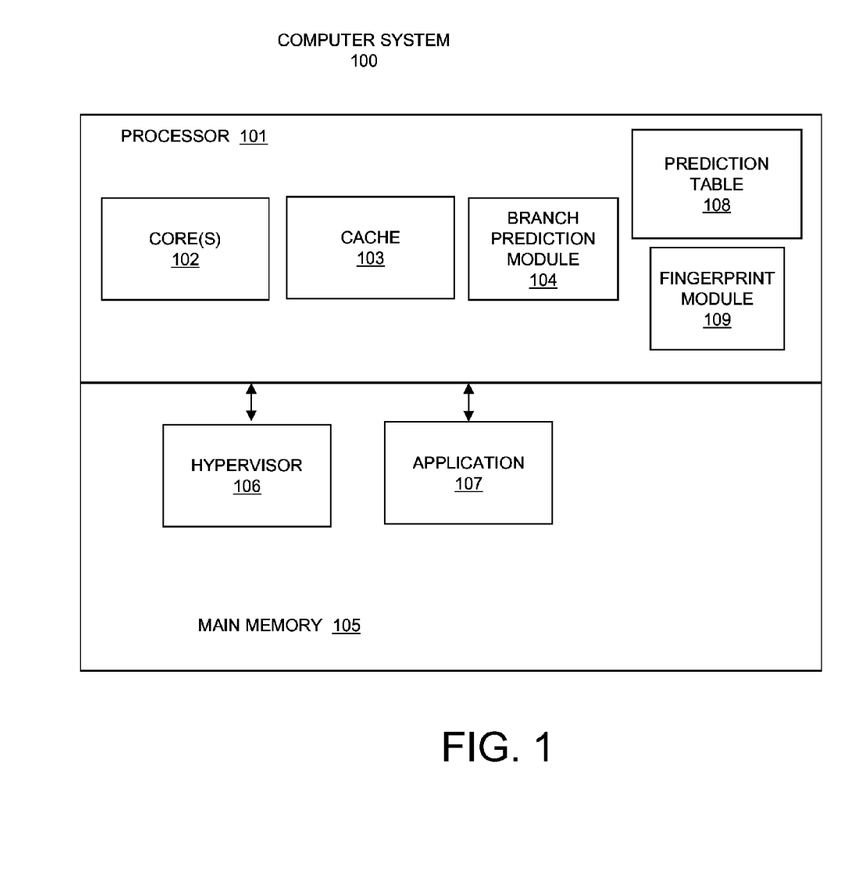
FIG. 1 depicts a computer system for fingerprint-based branch prediction in accordance with an embodiment.

FIG. 1 depicts a computer system for implementing fingerprint-based processor parameter management in accordance with an embodiment. Computer system 100 includes a processor 101 in communication with a main memory 105. The processor 101 includes one or more cores 102 that execute instructions using cache memory 103. Computer programs, such hypervisor 106 and application 107, are stored in main memory 105 and executed by the processor 101. Any appropriate number of applications such as application 107 may be executed by a computer system such as computer system 100. Whenever a branch instruction is encountered during execution of a computer program such as application 107 by the processor 101, the branch prediction module 104 determines, based on prediction table 108 and fingerprint module 109, a prediction for the resolution of the branch instructions, so that execution of the computer program may continue before branch resolution occurs. Prediction table 108 may comprise a pattern history table and/or a branch target buffer in various embodiments, and store branch-related information with associated fingerprints. The fingerprint module 109 may comprise a fingerprint register in some embodiments, and is used to determine the fingerprint of the workload that is currently executing. In various embodiments, a processor 101 may include a plurality of different fingerprint modules 109 that track different types of processor behavior (e.g., prefetch or branch prediction related behavior).

Figure 2:
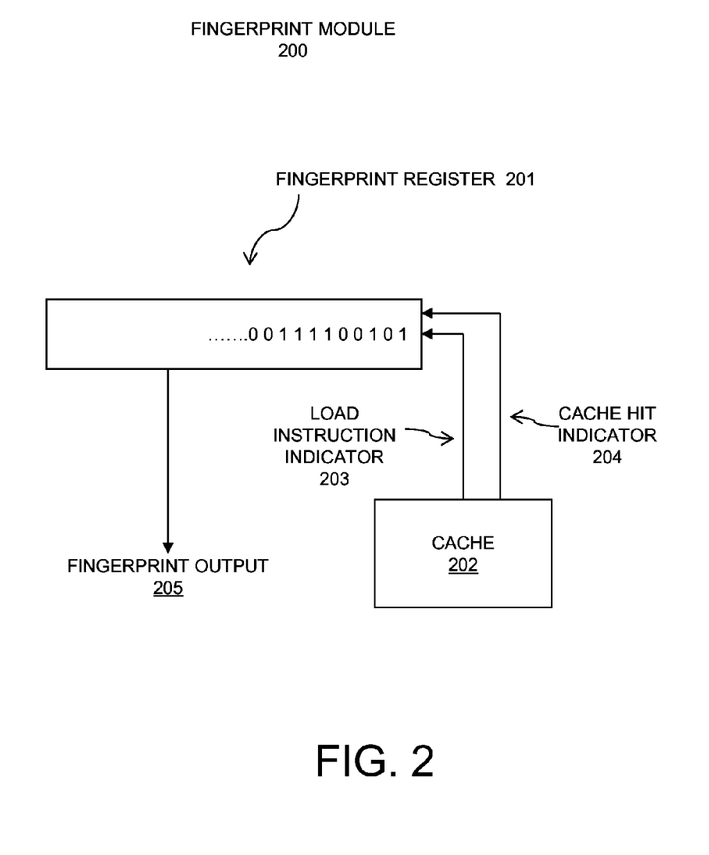
FIG. 2 depicts a fingerprint module in accordance with an embodiment.

FIG. 2 depicts a fingerprint module 200 in accordance with an embodiment. Fingerprint module 200 is a hardware module, and may comprise fingerprint module 104 in processor 101 of FIG. 1. Fingerprint module 200 comprises a fingerprint register 201 that is a shift register. As shown in FIG. 2, fingerprint register 201 receives input from a cache 202/103 via load instruction indicator 203 and cache hit indicator 204. A '1' is input into the shift register when there is a cache hit, and a '0' is loaded into the shift register when there is a cache miss (i.e., a load instruction with no cache hit). A fingerprint is output on fingerprint output 205; the fingerprint gives a snapshot of the cache hit/miss behavior of the current workload and may be used to identify a workload. The fingerprint register 201 may be of any appropriate size, and the fingerprint that is output on fingerprint output 205 may be the entire contents of the fingerprint register 201 in some embodiments. FIG. 2 is shown for illustrative purposes only; a fingerprint module comprising a shift register may measure any aspect of processor performance in various embodiments. For example, a fingerprint register such as fingerprint register 201 may be in communication with the branch prediction module 104 in order to track incorrect branch predictions.

Figure 3:
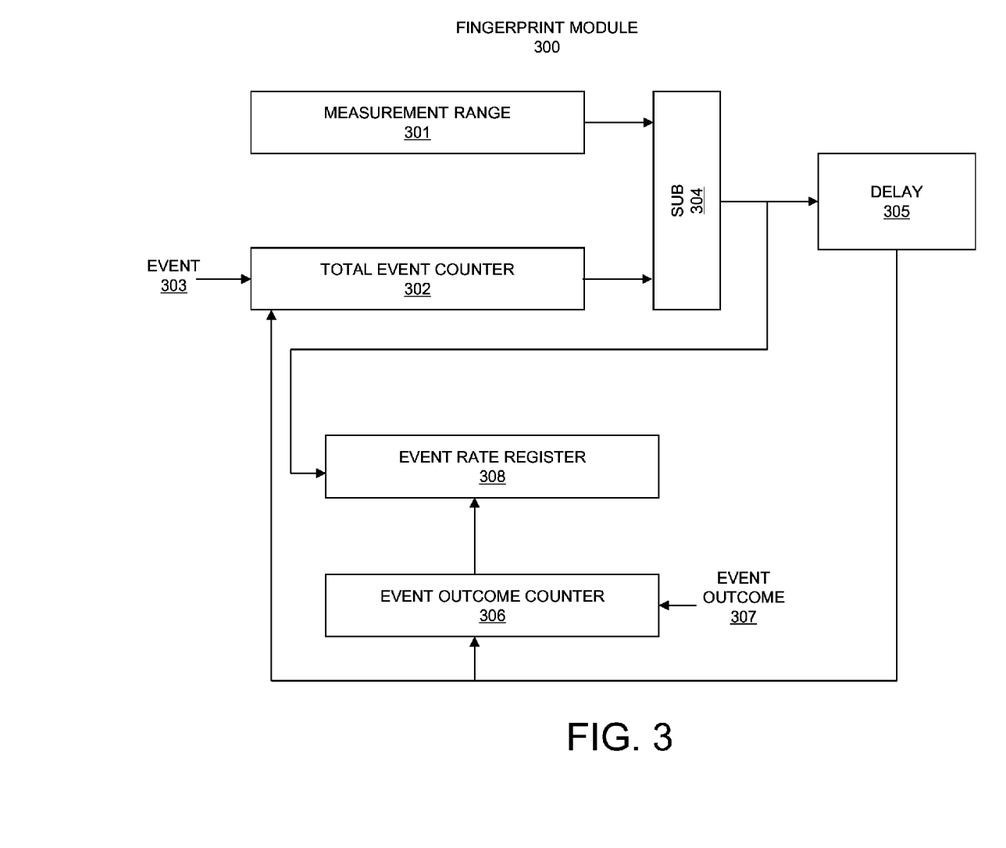
FIG. 3 depicts a fingerprint module in accordance with an embodiment.

FIG. 3 depicts a fingerprint module 300 in accordance with an embodiment. Fingerprint module 300 is a hardware module, and may comprise fingerprint module 104 in processor 101 of FIG. 1. In fingerprint module 300, the event outcome counter 306 counts each time the event (e.g. cache misses) whose rate is being measured by the fingerprint module 300 occurs, as indicated by event outcome input 307. The total event counter 302 counts the total number of events, such as branch instructions, that occur, as indicated by event input 303. The measurement range 301 gives a number of events over which the rate is being measured (e.g. every 1000 loads, or every 1000 instructions, etc.). Whenever the total event counter 302 reaches the number of events over which the rate is being measured as given by measurement rage 301, the subtractor module 304 outputs a signal to the event rate register 308 and delay module 305. The current value of the event outcome counter 306 is gated into event rate register 308 based on the signal from the subtractor module 304. Then, the total event counter 302 and event outcome counter 306 are reset based on the signal from delay module 305. The value in the event rate register 308 therefore represents the rate at which the event being measured (e.g., cache misses) has occurred during the number of branch instructions over which the rate is being measured. The value in event rate register 308 may be used as a fingerprint, or as part of a fingerprint in conjunction with another fingerprint module output. FIG. 3 is shown for illustrative purposes only; a fingerprint module comprising a rate measurement module may measure any aspect of processor performance in various embodiments, such as incorrect branch predictions or prefetch-related rates.

Figure 4:
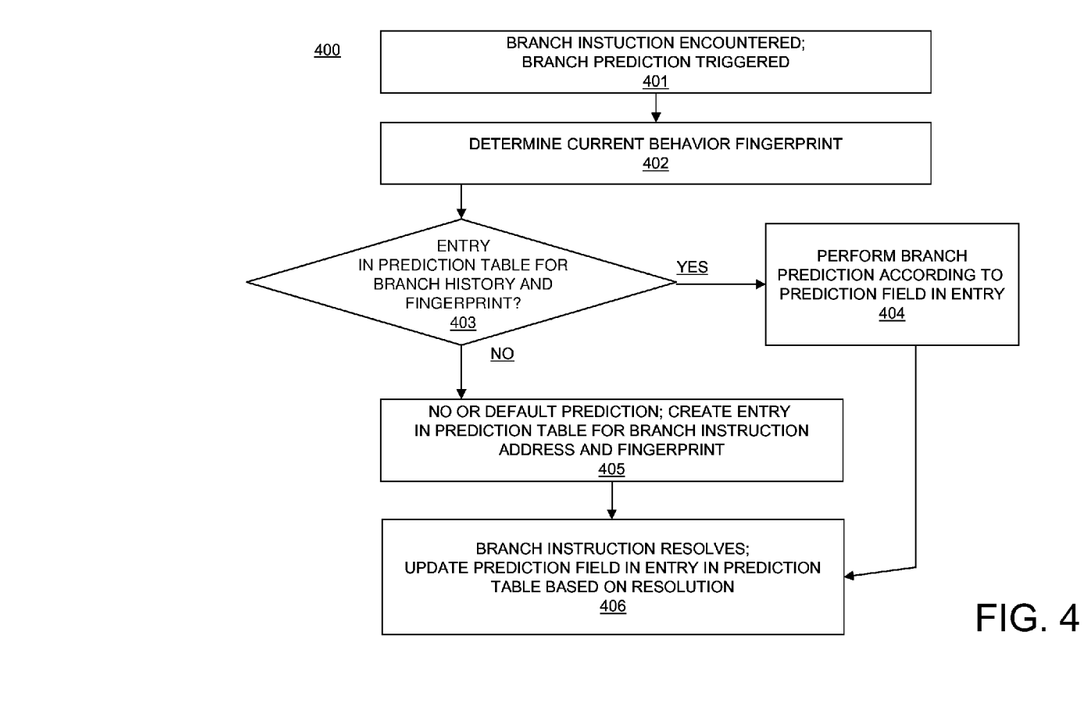
FIG. 4 depicts a process flow for fingerprint-based branch prediction in accordance with an embodiment.

FIG. 4 depicts a method 400 for processor parameter management using fingerprints in accordance with an embodiment. FIG. 4 is discussed with respect to FIG. 1. First, in block 401, a branch instruction is encountered during execution of a computer program, such as hypervisor 106 or application 107. Next, in block 402, the current fingerprint of the computer program at the time when the branch instruction is executed is determined based on one or more fingerprint modules such as fingerprint module 109. The fingerprint represents the historical behavior of the processor leading up to the point at which the branch instruction was encountered, and determination may comprise reading the current value of a fingerprint register 201 and/or an event rate register 308. The fingerprint module(s) may indicate any aspect of the behavior of a computer program. The fingerprint module(s) that are used to determine the current fingerprint in block 402 may comprise any of fingerprint module 200 of FIG. 2 and fingerprint module 300 of FIG. 3. Further, a computer system may include multiple fingerprint modules that measure different execution behavior, for example prefetching or branch prediction related behavior. Next, in block 403, it is determined whether a match for the branch instruction that is being predicted, and the current fingerprint that was determined in block 402, is located in an entry in prediction table 108 (i.e., there is an entry in a pattern history table with a matching branch history and fingerprint, or an entry in a branch target buffer with a matching branch instruction address and current fingerprint).

If it is determined in block 403 that a matching entry was found in prediction tables 108, then, in block 404, the branch instruction is predicted according to the prediction field in the entry (e.g., taken or not taken, or a particular target address). Execution of the computer program continues according to the prediction, and flow proceeds from block 404 to block 406. If it was determined in block 403 that there is no matching entry in prediction tables 108, flow proceeds from block 403 to block 405. In block 405, no prediction or a default prediction is made for the branch instruction, and a new entry is created in the prediction table 108 for the current fingerprint. If prediction table 108 is full, the new entry may replace an existing entry; for example, the least-recently used entry in the prediction table 108 may be replaced. Execution of the computer program proceeds, and flow proceeds to from block 405 to block 406. In block 406, the branch instruction resolves, and the prediction field in the entry corresponding to the branch instruction and the current fingerprint in the prediction table 108 is updated according to the resolution of the branch instruction.

Figure 5:
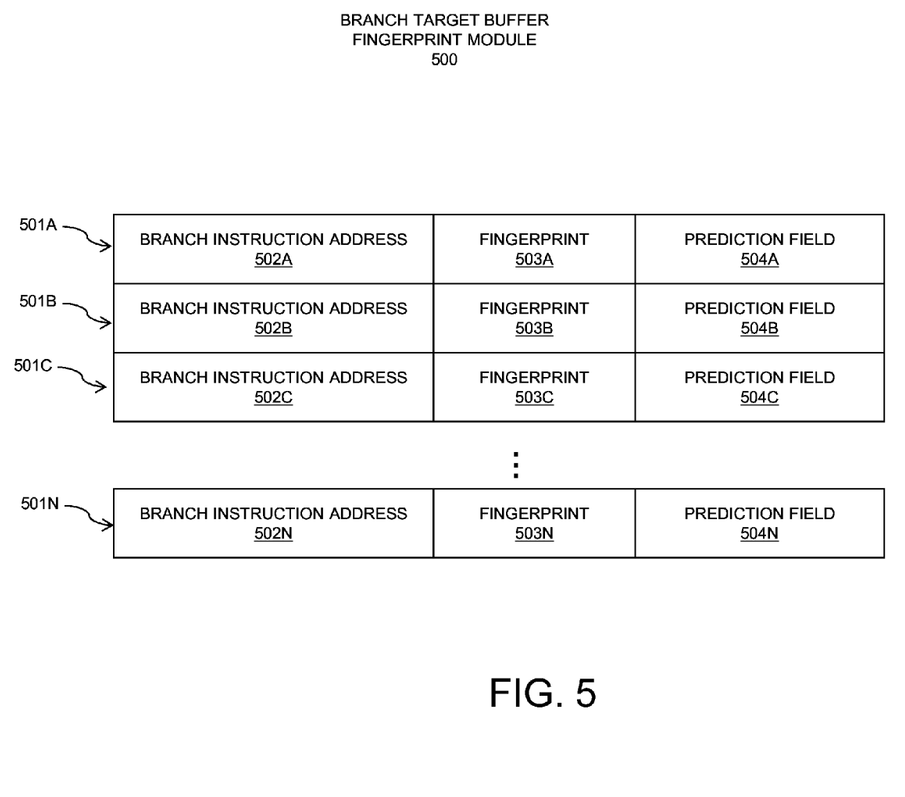
FIGS. 5 and 6 depict prediction tables for fingerprint-based branch prediction in accordance with embodiments.

FIG. 5 illustrates an embodiment of a branch target buffer 500, which may be part of prediction table 108 of FIG. 1. The branch target buffer 500 includes a plurality of entries 501A-N. Each entry of entries 501A-N includes a respective branch instruction address 502A-N, fingerprint 503A-N, and prediction field 504A-N. The branch target buffer 500 may include multiple entries for the same branch instruction address, each having a different respective value in the fingerprint field. The prediction field 504A-N may be any appropriate value in various embodiments, such as a target instruction address. Branch target buffer 500 is shown for illustrative purposes only; a branch target buffer may include any appropriate number of entries and fields per entry.

Figure 6:
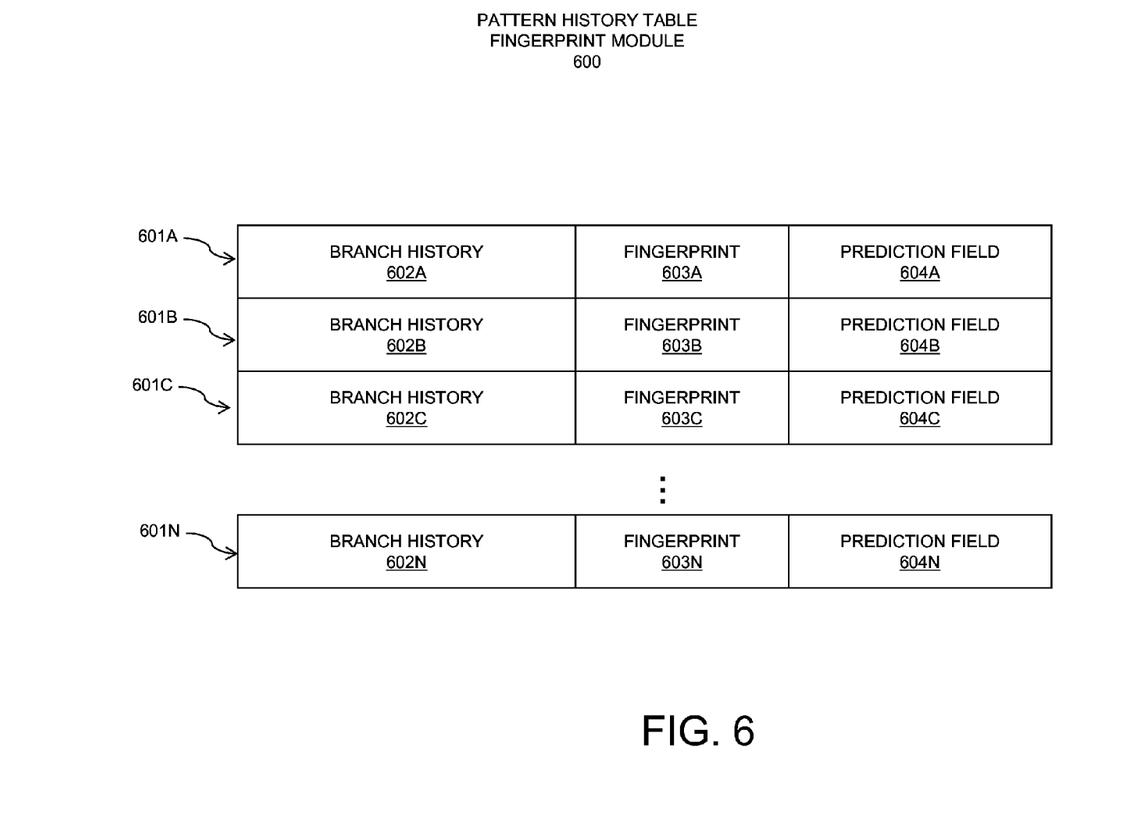

FIG. 6 illustrates an embodiment of a pattern history table 600, which may be part of prediction table 108 of FIG. 1. The pattern history table 600 includes a plurality of entries 601A-N. Each entry of entries 601A-N includes a respective branch history 602A-N, fingerprint 603A-N, and prediction field 604A-N. The pattern history table 600 may include multiple entries for the same branch history, each having a different respective value in the fingerprint field. The prediction field 604A-N may be any appropriate value in various embodiments, such as an n-bit state machine that indicates whether the branch instruction should be predicted taken or not taken. Pattern history table 600 is shown for illustrative purposes only; a pattern history table may include any appropriate number of entries and fields per entry.

Technical effects and benefits include improved branch prediction accuracy in a computer processor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for fingerprint-based branch prediction, the method comprising:
    based on encountering a branch instruction during execution of software on a processor of a computer system, determining a fingerprint of the software, the fingerprint comprising a representation of a sequence of behavior that occurs in the processor while the software is executing;
    determining whether a match for the fingerprint and the branch instruction is located in an entry in a prediction table, the entry including an associated prediction field;
    based on determining that a match for the fingerprint and the branch instruction is located in an entry in the prediction table:
        predicting the branch instruction according to the associated prediction field; and
        based on resolution of the branch instruction, updating the associated prediction field;
    based on determining that no match for the fingerprint and the branch instruction is located in an entry in the prediction table:
        creating a new entry in the prediction table for the fingerprint and the branch instruction; and
        based on resolution of the branch instruction, updating a prediction field of the new entry according to the resolution, and
    wherein determining the fingerprint comprises tracking a rate of occurrence of an event outcome for an event in the processor by a fingerprint module, wherein the fingerprint module counts a number of occurrences of the event outcome over a predetermined number of occurrences of the event.

2. The method of claim 1, wherein determining the fingerprint further comprises tracking the event in the processor by a fingerprint register, wherein the fingerprint register holds a sequence of ones and zeros indicating different outcomes of the event.

3. The method of claim 2, wherein the event comprises a cache access, wherein the different outcomes comprise cache hits and cache misses.

4. The method of claim 2, wherein the event comprises branch prediction, wherein the different outcomes comprise correct branch predictions and incorrect branch predictions.

5. The method of claim 1, wherein the prediction table comprises a branch target buffer, and comprises a plurality of entries corresponding to an address of the branch instruction, each of the plurality of entries comprises a different respective fingerprint.

6. A computer program product for implementing fingerprint-based branch prediction, the computer program product comprising:
- a computer readable storage medium having program instructions embodied therewith, the program instructions readable by a processor of a computer system to cause the processor to perform a method comprising:
- based on encountering a branch instruction during execution of software on the processor, determining a fingerprint of the software, the fingerprint comprising a representation of a sequence of behavior that occurs in the processor while the software is executing;
- determining whether a match for the fingerprint and the branch instruction is located in an entry in a prediction table, the entry including an associated prediction field;
- based on determining that a match for the fingerprint and the branch instruction is located in an entry in the prediction table:
  - predicting the branch instruction according to the associated prediction field; and
  - based on resolution of the branch instruction, updating the associated prediction field;
- based on determining that no match for the fingerprint and the branch instruction is located in an entry in the prediction table:
  - creating a new entry in the prediction table for the fingerprint and the branch instruction; and
  - based on resolution of the branch instruction, updating a prediction field of the new entry according to the resolution, and
- wherein determining the fingerprint comprises tracking a rate of occurrence of an event outcome for an event in the processor by a fingerprint module, wherein the fingerprint module counts a number of occurrences of the event outcome over a predetermined number of occurrences of the event.

7. The computer program product of claim 6, wherein determining the fingerprint further comprises tracking the event in the processor by a fingerprint register, wherein the fingerprint register holds a sequence of ones and zeros indicating different outcomes of the event.

8. The computer program product of claim 7, wherein the event comprises a cache access, wherein the different outcomes comprise cache hits and cache misses.

9. The computer program product of claim 7, wherein the event comprises branch prediction, wherein the different outcomes comprise correct branch predictions and incorrect branch predictions.

10. The computer program product of claim 6, wherein the prediction table comprises a branch target buffer, and comprises a plurality of entries corresponding to an address of the branch instruction, each of the plurality of entries comprises a different respective fingerprint.

* * * * *